UNITED STATES PATENT OFFICE 2,005,042

PROCESS FOR THE MANUFACTURE OF COMPOUNDS OF THE ETHYLENE SERIES SUBSTITUTED BY AN AROMATIC RESIDUE

Willi Krey, Uerdingen, Germany, assignor to I. G. Farbenindustrie Aktiengesellschaft, Frankfort-on-the-Main, Germany No Drawing. Application January 11, 1932, Serial No. 586,083. In Germany January 17, 1931

23 Claims. (Cl. 260—168)

The present invention concerns the manufacture of compounds of the ethylene series of the general formula

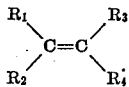

wherein $R_1$ represents an aromatic radical, such as a phenyl radical, a substituted phenyl radical, a naphthyl radical or a substituted naphthyl radical etc., $R_2$, $R_3$ and $R_4$ being a hydrogen atom or a substituent such as a halogen atom, an aryl radical or a substituted aryl radical, an alkyl radical etc.

In accordance with the present invention the splitting of 1-chloro-1-arylethanes into hydrochloric acid and an aromatic ethylene compound can be accomplished in a very simple and economical manner by heating the chloro compounds with acid-reacting compounds containing oxygen, the acid reaction of which is due to the presence of a dissociable hydrogen atom attached to an oxygen atom, such as e. g. boric acid, arsenic acid, palmitic acid, mono-chloroacetic acid, benzoic acid, p-chloro-benzoic acid, α-naphthalene carboxylic acid, salicylic acid, benzene sulfonic acid, phenol, chlorophenol, picric acid and the like. In this process the weaker acids preferably organic acids soluble in the reaction mixture are made use of with advantage as they do not cause polymerization of the resulting aromatic vinyl compound or only do so to a slight extent. Such polymerization can likewise be suppressed by distilling off the aromatic vinyl compound at the rate it is produced and by adding to the reaction mixture substances which retard polymerization such as nitro-benzene, nitro anthraquinone etc.

For the purpose of this invention 1-chloro-1-arylethanes of the general formula

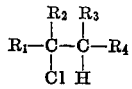

$R_1$ being an aromatic radical, such as e. g. a phenyl radical, a substituted phenyl radical, a naphthyl radical or a substituted naphthyl radical etc., $R_2$, $R_3$ and $R_4$ being a hydrogen atom or a substituent such as a halogen atom, an aryl radical or a substituted aryl radical, an alkyl radical etc., can be used. It being noted that the 1-chloro-1-arylethanes of the general formula

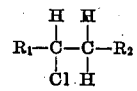

in which $R_1$ represents a phenyl radical or a substituted phenyl radical and $R_2$ represents a hydrogen or a chlorine atom are especially suitable for the manufacture of the corresponding aromatic vinyl compounds in accordance with the present invention.

A special advantage of the new method of working consists in the fact that much less than the quantity of the above acids is required than is equivalent to the chloro compound, e. g. 1–10% by weight calculated on the amount of the chloro compound used. The acids are not used up but act catalytically.

The hydrochloric acid liberated can be employed with advantage for the manufacture of new quantities of the chloride serving as the starting material for the above described process, for example in accordance with the co-pending application Serial No. 563,462.

The process is further illustrated by the following examples without, however, restricting the invention to the particular quantities, temperatures or other conditions; the parts being by weight:

Example 1

500 parts of α-chloro-ethylbenzene are heated with 50 parts of benzoic acid and 10 parts of anthraquinone. The evolution of hydrochloric acid commences at 130–140° C. The reaction proceeds quickly at 150–200° C. The resulting styrene is distilled off continuously through a small column, which retains unaltered chloroethylbenzene. The hydrochloric acid liberated is absorbed in water in the known manner. The distillate is fractionated after washing with a solution of sodium carbonate in order to remove the hydrochloric acid present in the distillate. The yield of styrene approximates the theoretical.

Example 2

500 parts of α-chloro-ethylbenzene are mixed with 10 parts of α-naphthalene carboxylic acid. Heating this mixture at a temperature of 130 to 140°, the evolution of hydrochloric acid commences. The reaction proceeds quickly at 150 to 200° C. The resulting styrene is distilled off as described in Example 1. Then the distillate is fractionated after washing with a solution of sodium carbonate as mentioned in Example 1. About 75% of the calculated quantity of styrol is obtained.

*Example 3*

Instead of the α-naphthalene carboxylic acid in Example 2 10 parts of mono-chloroacetic acid are used. About 80% of the calculated quantity of styrene is obtained.

*Example 4*

Instead of the α-naphthalene carboxylic acid in Example 3 50 parts of phenol are used. About 58% of the calculated quantity of styrene is obtained.

In the following claims the term "acid-reacting compound containing oxygen" is to denote a compound, the acid reaction of which is due to the presence of a dissociable hydrogen atom attached to an oxygen atom.

I claim:

1. The process which comprises heating α-chloro-ethyl-benzene with an organic acid-reacting compound containing oxygen.

2. The process which comprises heating α-chloro-ethyl-benzene with benzoic acid.

3. The process which comprises heating α-chloro-ethyl-benzene with benzoic acid at a temperature of about 130° to about 200° C.

4. The process which comprises heating α-chloro-ethyl-benzene with benzoic acid and anthraquinone at a temperature of about 130° to about 200° C.

5. The process which comprises heating α-chloro-ethyl-benzene with mono-chloroacetic acid at a temperature of about 130° to about 200° C.

6. The process which comprises heating an 1-chloro-1-arylethane of the general formula:

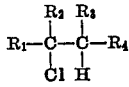

R₁ being a phenyl radicle or a naphthyl radicle, R₂, R₃ and R₄ being a hydrogen atom or a halogen atom with an organic acid-reacting compound containing oxygen.

7. The process which comprises heating an 1-chloro-1-arylethane of the general formula:

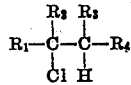

R₁ being a phenyl radicle or a naphthyl radicle, R₂, R₃ and R₄ being a hydrogen atom or a halogen atom with benzoic acid.

8. The process which comprises heating an 1-chloro-1-arylethane of the general formula:

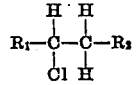

in which R₁ represents a phenyl radical and R₂ represents a hydrogen or a chlorine atom with an organic acid-reacting compound containing oxygen.

9. The process which comprises heating an 1-chloro-1-arylethane of the general formula:

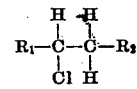

in which R₁ represents a phenyl radical and R₂ represents a hydrogen or a chlorine atom with benzoic acid.

10. The process which comprises heating an 1-chloro-1-arylethane of the general formula

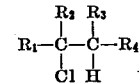

R₁ being a phenyl radicle or a naphthyl radicle, R₂, R₃ and R₄ being a hydrogen atom or a halogen atom with an acid-reacting compound containing oxygen which does not cause a substantial polymerization of the resulting aromatic vinyl compound.

11. The process which comprises heating an 1-chloro-1-arylethane of the general formula

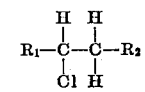

in which R₁ represents a phenyl radicle and R₂ represents a hydrogen or a chlorine atom with an acid-reacting compound containing oxygen which does not cause a substantial polymerization of the resulting aromatic vinyl compound.

12. The process which comprises heating alpha-chloro-ethylbenzene with an acid-reacting compound containing oxygen which does not cause a substantial polymerization of the resulting aromatic vinyl compound.

13. The process which comprises heating alpha-chloro-ethylbenzene with an acid-reacting compound containing oxygen which does not cause a substantial polymerization of the resulting aromatic vinyl compound and a substance retarding polymerization.

14. The process which comprises heating an 1-chloro-1-aryl-ethane of the general formula:

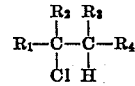

R₁ being a phenyl radicle or a naphthyl radicle, R₂, R₃ and R₄ being a hydrogen atom or a halogen atom with a compound containing oxygen, said compound showing a weak acid reaction.

15. The process which comprises heating an 1-chloro-1-aryl-ethane of the general formula:

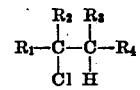

R₁ being a phenyl radicle or a naphthyl radicle, R₂, R₃ and R₄ being a hydrogen atom or a halogen atom with a compound containing oxygen, said compound showing a weak acid reaction and being soluble in the reaction mixture.

16. The process which comprises heating an 1-chloro-1-arylethane of the general formula:

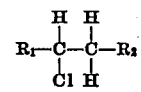

in which R₁ represents a phenyl radicle and R₂ represents a hydrogen or a chlorine atom with a compound containing oxygen, said compound showing a weak acid reaction.

17. The process which comprises heating an 1-chloro-1-arylethane of the general formula:

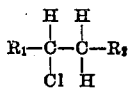

in which $R_1$ represents a phenyl radicle and $R_2$ represents a hydrogen or a chlorine atom with a compound containing oxygen, said compound showing a weak acid reaction and being soluble in the reaction mixture.

18. The process which comprises heating alpha-chloro-ethyl-benzene with a compound containing oxygen, said compound showing a weak acid reaction.

19. The process which comprises heating alpha-chloro-ethyl-benzene with a compound containing oxygen, said compound showing a weak acid reaction and being soluble in the reaction mixture.

20. The process which comprises heating alpha-chloro-ethyl-benzene with a compound containing oxygen, said compound showing a weak acid reaction and a substance retarding polymerization.

21. The process which comprises heating alpha-chloro-ethyl-benzene with a compound containing oxygen, said compound showing a weak acid reaction and being soluble in the reaction mixture, and a substance retarding polymerization.

22. The process which comprises heating an 1-chlor-1-arylethane of the general formula

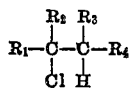

$R_1$ being a phenyl radicle or a naphthyl radicle, $R_2$, $R_3$ and $R_4$ being a hydrogen atom or a halogen atom with an acid-reacting compound containing oxygen which does not cause a substantial polymerization of the resulting aromatic vinyl compound, and the acid reaction of which is due to the presence of a dissociable hydrogen atom attached to an oxygen atom.

23. The process which comprises heating an 1-chloro-1-arylethane of the general formula

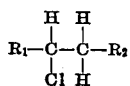

in which $R_1$ represents a phenyl radicle and $R_2$ represents a hydrogen or a chlorine atom with an acid reacting compound containing oxygen which does not cause a substantial polymerization of the resulting aromatic vinyl compound, and the acid reaction of which is due to the presence of a dissociable hydrogen atom attached to an oxygen atom.

WILLI KREY.